(12) United States Patent
Patterson et al.

(10) Patent No.: US 11,125,363 B1
(45) Date of Patent: Sep. 21, 2021

(54) QUICK COUPLING SYSTEM FOR VERTICAL FLUID CONVEYING CONDUITS

(71) Applicant: AGI INDUSTRIES, INC., Lafayette, LA (US)

(72) Inventors: David A. Patterson, Youngsville, LA (US); Anthony E. Taylor, Lafayette, LA (US); Craig C. Derouen, Lafayette, LA (US)

(73) Assignee: AGI INDUSTRIES, INC., Lafayette, LA (US)

( * ) Notice: Subject to any disclaimer, the term of this patent is extended or adjusted under 35 U.S.C. 154(b) by 402 days.

(21) Appl. No.: 16/012,414

(22) Filed: Jun. 19, 2018

Related U.S. Application Data (63) Continuation-in-part of application No. 14/530,748, filed on Nov. 1, 2014, now abandoned.

(60) Provisional application No. 61/898,978, filed on Nov. 1, 2013.

(51) Int. Cl.
*F16L 21/06* (2006.01)
*F16L 37/10* (2006.01)
*F16L 21/08* (2006.01)

(52) U.S. Cl.
CPC .............. *F16L 21/06* (2013.01); *F16L 21/08* (2013.01); *F16L 37/10* (2013.01)

(58) Field of Classification Search
CPC ......... F16L 23/20; F16L 23/22; F16L 23/003; F16L 23/04; F16L 21/06; F16L 21/002; F16L 2101/70; F16L 13/0236
See application file for complete search history.

(56) References Cited

U.S. PATENT DOCUMENTS

| | | | | |
|---|---|---|---|---|
| 2,362,686 A * | 11/1944 | Delano | ................. | F16L 19/05 285/332.3 |
| 4,470,609 A * | 9/1984 | Poe | ........................ | F16L 23/18 277/623 |
| 6,312,018 B1 * | 11/2001 | Martin | ................... | B21D 39/10 285/382.4 |
| 6,375,228 B1 * | 4/2002 | Klemm | ................... | F16L 23/04 285/112 |
| 6,481,755 B2 * | 11/2002 | Hulsebos | ................ | F16L 17/10 285/104 |
| 6,595,559 B1 * | 7/2003 | Readman | ................ | F16L 13/10 285/371 |
| 8,091,932 B2 * | 1/2012 | Nijsen | ..................... | F16L 21/04 285/421 |
| 8,419,071 B2 * | 4/2013 | Gentille | ................ | F16L 33/213 285/97 |
| 8,596,692 B1 * | 12/2013 | Gourlay | .................. | F16L 23/04 285/370 |
| 2004/0239116 A1 * | 12/2004 | Cooke, Jr. | ........... | F16L 19/0231 285/354 |

FOREIGN PATENT DOCUMENTS

| | | | | |
|---|---|---|---|---|
| DE | 10007369 A1 * | 8/2001 | ............ | F16L 21/06 |
| EP | 1927805 A1 * | 6/2008 | ............ | F16L 23/003 |

* cited by examiner

*Primary Examiner* — Matthew Troutman
*Assistant Examiner* — James A Linford
(74) *Attorney, Agent, or Firm* — Ted M. Anthony

(57) ABSTRACT

A coupling system for quickly connecting fluid conveying conduits.

6 Claims, 3 Drawing Sheets

QUICK COUPLING SYSTEM FOR VERTICAL FLUID CONVEYING CONDUITS

CROSS REFERENCES TO RELATED APPLICATIONS

This application is a Continuation-in-Part of U.S. patent application Ser. No. 14/530,748 filed Nov. 1, 2014, currently pending, which claims priority of U.S. Provisional patent application Ser. No. 61/898,978, filed Nov. 1, 2013, all incorporated herein by reference.

STATEMENTS AS TO THE RIGHTS TO THE INVENTION MADE UNDER FEDERALLY SPONSORED RESEARCH AND DEVELOPMENT

None

FIELD OF THE INVENTION

The subject invention relates generally to mechanical coupling systems for connecting fluid conveying conduits. More specifically, the subject invention relates to a quick coupling system for removably installing a submersible pump on a vertical pipe, particularly, but not necessarily, in an offshore environment. It will be appreciated that the subject invention has broader aspects and may be used for quickly and removably coupling other types of conduits.

BACKGROUND OF THE INVENTION

Various forms of conduit systems are well known for use in diverse applications, ranging, for example, from plumbing systems conveying potable drinking water under pressure, to waste water systems, often referred to as drain/waste/vent (or DWV) systems, conveying sewage and gray water gravitationally under neutral pressure, and to systems in the oil and gas industry conveying potentially dangerous chemical liquids and gases.

Essentially all such conduit systems are fabricated of a network of conduit sections coupled together with various couplings. Depending on the application, conduit sections and couplings may be formed of various materials, typically either metallic materials such as carbon steel, stainless steel, galvanized steel, cast-iron, aluminum, and copper, or plastic materials, such as PVC (polyvinyl chloride), PP (polypropylene), ABS (acrylonitrile butadiene styrene), or PE (polyethylene). In substantially all cases, the coupling joints in a pipe system must be secure against leakage.

It is often desirable to have a coupling system for conduits that can be easily and quickly connected and disconnected. Coupling systems for connecting and disconnecting two sections of conduit together, or for connecting the end of a conduit to a piece of equipment, such as a pump or the like, exist in the prior art in various forms. Coupling systems are typically comprised of male and female members connected in fluid-tight relationship by some form of retention mechanism to provide sealed fluid communication between adjoining sections of conduit, or between a section of conduit and a piece of equipment, such as a pump or the like. Such coupling systems include threaded fasteners, nuts and sleeves, bolted retaining flanges, ball detents, ring clamps, and the like. The type of coupling, the operating pressure, the expected frequency of decoupling and the access conditions, often determine the required form of coupling system in any particular application. The present invention provides an improved coupling system for quickly connecting and disconnecting a series of conduits to a vertical submersible pump, particularly, but not necessarily, in an offshore environment.

SUMMARY OF THE INVENTION

The subject invention is a quick coupling system designed to form a fluid-tight sealing connection between generally tubular conduits connected to submersible pumps and other similar equipment. While the preferred embodiment of the subject invention is described in the context of tubular conduits connected to submersible pumps and other similar equipment, the subject invention can be used with other types of piping without departing from the spirit and scope of the claimed invention.

A "conduit" as used in this context encompasses any tubular structure capable of fluid conveyance therethrough. Likewise, an "end" of a conduit is any termination of the tubular structure defining an opening through which fluid enters or exits the conduit. A "conduit" may be linear (straight) or non-linear (e.g., curvilinear) in the direction of fluid conveyance, and may be of differing transverse cross-sectional shapes, often round but not necessarily cylindrical or uniform in transverse cross-section.

Instead of a bolted flange configuration, the quick coupling system of the subject invention includes a seal ring that is designed to form a fluid-tight seal between the connected ends of the two conduits. Each of the connected ends of the two conduits is equipped with a fitted ring that is attached to the end of the conduit. The seal ring equipped with elastomer seals is then placed between each end ring. Once the seal ring is placed between the two end rings to form a fluid-tight joint between the conduits, a two-piece clamp ring is placed over the joint to lock the seal ring and the two end rings together. A lock ring is then slid over the two-piece clamp ring to prevent the two pieces from separating.

The quick coupling system of the present invention connects the ends of two conduits without the need for special geometrical shapes at the end of the conduits, such as bell and spigot configurations typically required in conventional piping connections. As a result, the quick coupling system reduces the expense and costs associated with forming special end configurations required for bell-and-spigot-type piping.

In addition, the quick coupling system requires fewer tools to install than a bolted flange connection. The quick coupling system also has fewer parts than a bolted flange connection. Fewer tools and fewer parts results in less time, effort, and cost when installing and removing the quick coupling system. The quick coupling system also has a smaller overall diameter than a bolted flange connection and it is less susceptible to seizing due to corrosion inside threaded joints.

BRIEF DESCRIPTION OF THE DRAWINGS

The accompanying drawings are provided for the purpose of illustration only and are not intended as a definition of the limits of the present invention. The drawings illustrate a preferred embodiment of the present invention, wherein.

DESCRIPTION OF THE INVENTION

While the present invention will be described with reference to a preferred embodiment, it will be understood by those skilled in the art that various changes may be made and equivalents may be substituted for elements thereof without departing from the spirit and scope of the claimed invention. In addition, many modifications may be made to adapt a particular situation or material to the teachings of the invention without departing from the essential scope thereof. Therefore, it is intended that the present invention not be limited to a particular embodiment disclosed as the best mode contemplated for carrying out this invention, but that the invention will include all embodiments (and legal equivalents thereof).

As shown in FIGS. 1 through 5, the preferred embodiment of the quick coupling system 10 of the present invention is designed to quickly connect and disconnect conduits 11 and 12 that are generally tubular in shape. It is to be expressly understood that the present invention is anticipated to be equally applicable to the joinder of conduits having different cross-sectional shapes.

As shown in FIGS. 1 through 5, conduits 11 and 12 are typical straight linear cylindrical conduits with plain circular ends, where the ends have the same diameter as the remaining length of the conduit, without any threads, flanges, sockets, or other geometrical shapes, such as bell and spigot configuration. Conduits 11 and 12 can be any dimension and can be manufactured using any material, such as carbon steel, stainless steel, super duplex stainless steel, high alloy steel, cast iron, aluminum, polyvinyl chloride ("PVC"), fiberglass, plastic, composite, etc. Conduits 11 and 12 can be used in most applications ranging in internal pressures from 1 psi to 15,000 psi, with a variety of chemical compositions flowing therethrough.

Figures 3, 4:
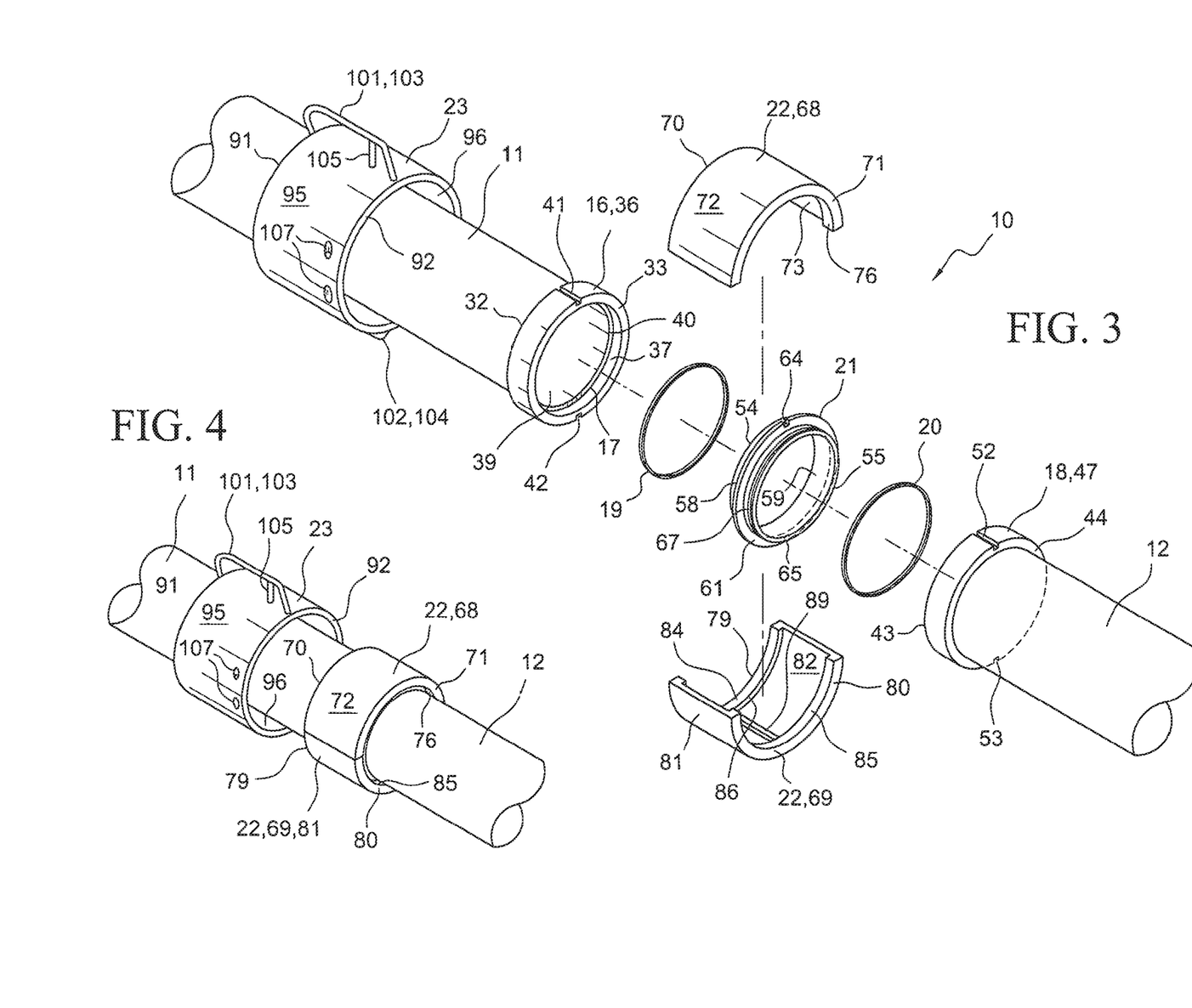
FIG. 3 is an exploded perspective view of the Quick Coupling System for Vertical Fluid Conveying Conduits.
FIG. 4 is a perspective view of the Quick Coupling System for Vertical Fluid Conveying Conduits, showing the lock ring off of the two-piece clamp ring.

Referring to FIG. 3, the quick coupling system 10 is shown in an exploded view and generally includes a stop ring 14 (shown in FIGS. 1, 2, and 5), a first fitted ring 16 (shown in FIGS. 3, 5, and 6), a second fitted ring 18 (shown in FIGS. 3 and 5), a first annular sealing member 19 (shown in FIGS. 3 and 5), a second annular sealing member 20 (shown in FIGS. 3 and 5), a seal ring 21 (shown in FIGS. 3, 5, and 6), a two-piece clamp ring 22 (shown in FIGS. 1 through 6), and a lock housing 23 (shown in FIGS. 1 through 6). All of these parts collectively serve to quickly connect conduits 11 and 12, to hold conduits 11 and 12 together, and, if desired or necessary, to quickly disconnect conduits 11 and 12, as described in more detail below.

Figures 1, 2:
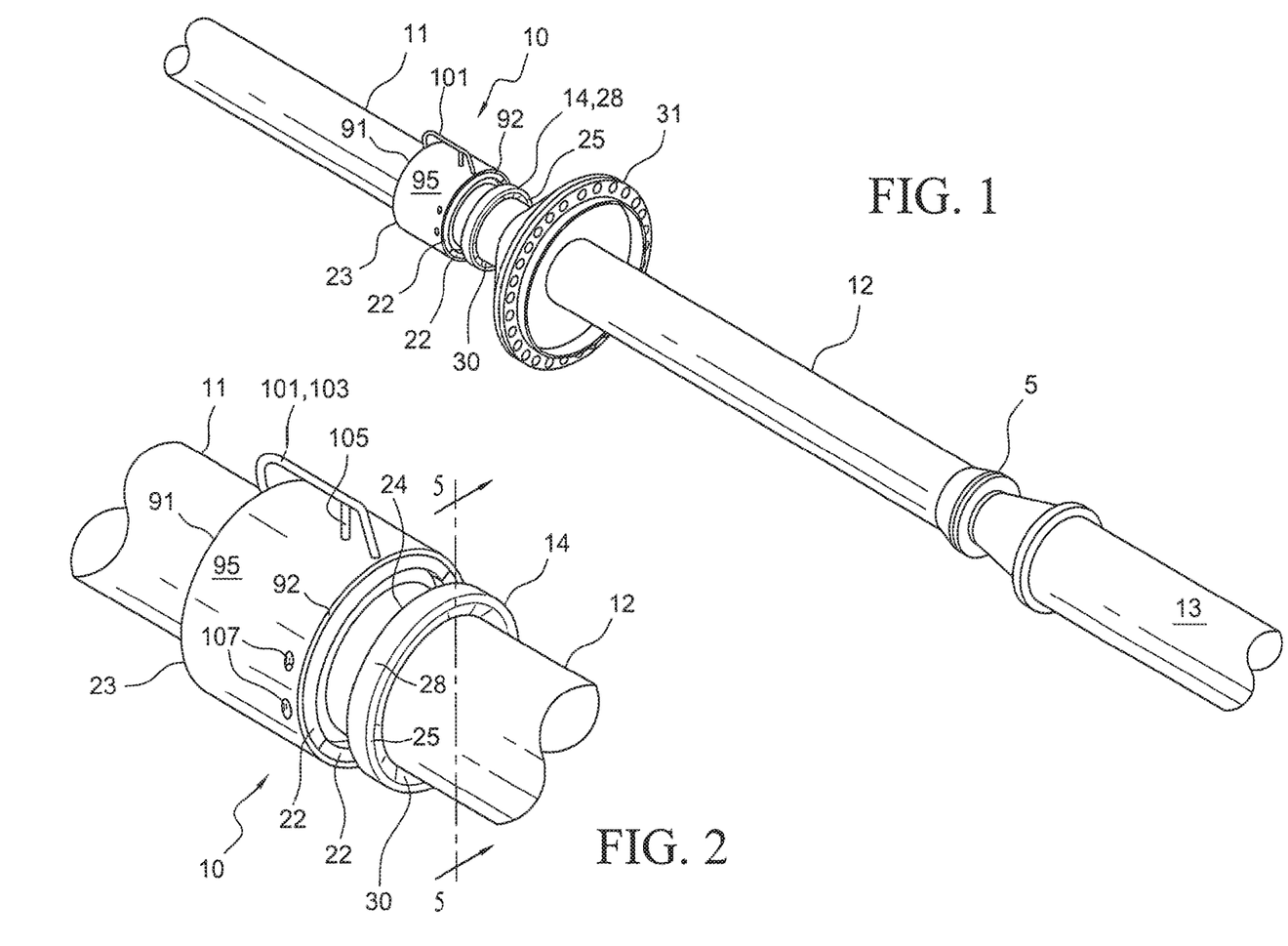
FIG. 1 is a perspective view of the Quick Coupling System for Vertical Fluid Conveying Conduits.
FIG. 2 is a close-up perspective view of the Quick Coupling System for Vertical Fluid Conveying Conduits.
Figure 5:
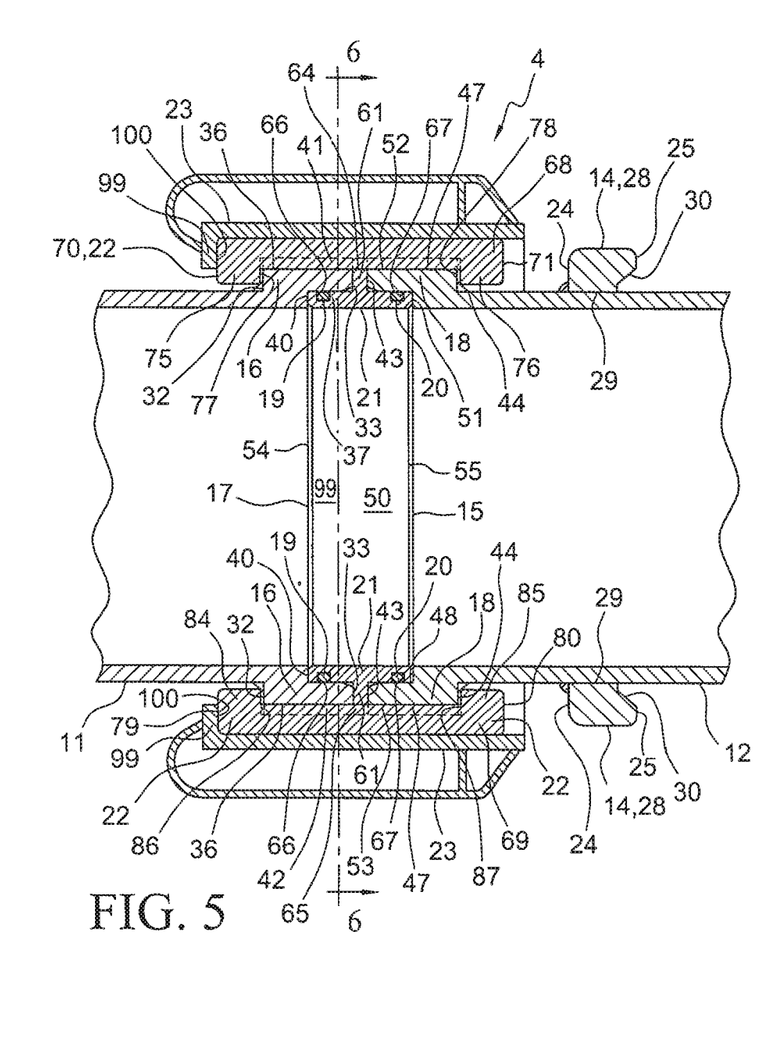
FIG. 5 is a cross-sectional view of the Quick Coupling System for Vertical Fluid Conveying Conduits taken along line 5-5 of FIG. 2.

Referring to FIGS. 1, 2, and 5, stop ring 14 is used when conduits 11 and 12 are being connected vertically. Stop ring 14 is a substantially cylindrical ring with an annular opening. Stop ring 14 can be made of several kinds of materials, such as carbon steel, stainless steel, super duplex stainless steel, high alloy steel, cast iron, aluminum, polyvinyl chloride ("PVC"), fiberglass, plastic, composite, etc., depending on the application. The dimensions of stop ring 14 depend on the size of the conduits being connected. Larger dimensions of stop ring 14 are required when larger conduits are being connected, and vice versa.

Stop ring 14 preferably has a first end 24, a second end 25, an outer diameter 26, an inner diameter 27, a cylindrical outside surface 28, and a cylindrical inside surface 29. The second end 25 of stop ring 14 preferably has a tapered circumferential shoulder 30 that can be used to lock the installation tool 31 in position (as shown in FIG. 1), as long as the weight of the pipe system is resting on installation tool 31.

Figure 6:
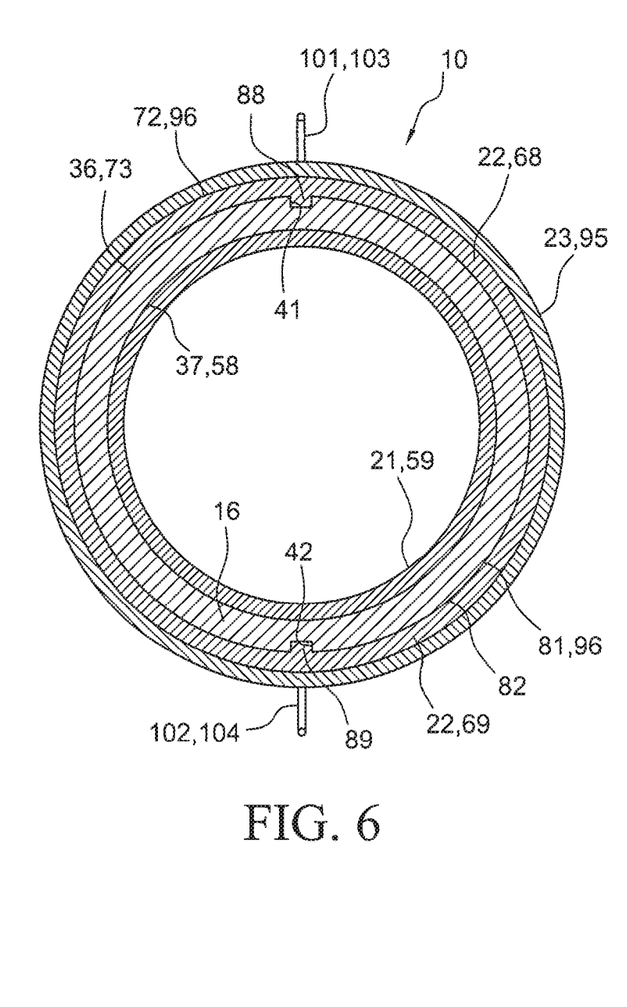
FIG. 6 is a cross-sectional view of the Quick Coupling System for Vertical Fluid Conveying Conduits taken along line 6-6 of FIG. 5.

Referring to FIGS. 3, 5, and 6, first fitted ring 16 is a substantially annular member with an annular opening. First fitted ring 16 can be made of several kinds of materials, such as carbon steel, stainless steel, super duplex stainless steel, high alloy steel, cast iron, aluminum, polyvinyl chloride ("PVC"), fiberglass, plastic, composite, etc., depending on the application. The dimensions of first fitted ring 16 will depend on the size of the conduits being connected. Larger dimensions of first fitted ring 16 are required when larger conduits are being connected, and vice versa. The dimensions of first fitted ring 16 will also depend on the operating pressure inside the conduits being connected. The thickness of first fitted ring 16 will typically increase as operating pressures inside the conduits are increased, and vice versa.

Still referring to FIGS. 3, 5, and 6, first fitted ring 16 preferably has a first end 32, a second end 33, an outer diameter 34, an inner diameter 35, a cylindrical outside surface 36, a cylindrical inside surface 37, and a length 38. Inner diameter 35 of first fitted ring 16 should be the same as or slightly greater than the outer diameter of conduit 11 so that the end 17 of conduit 11 can be longitudinally inserted through first end 32 of first fitted ring 16 approximately half the length 38 of first fitted ring 16. When the end of conduit 11 is longitudinally inserted through first end 32 of first fitted ring 16, a portion of the outer cylindrical surface of conduit 11 preferably should be in contact with approximately half of cylindrical inside surface 37 of first fitted ring 16.

In the preferred embodiment, the outer cylindrical surface of conduit 11 can be permanently affixed to approximately half of cylindrical inside surface 37 of first fitted ring 16. By way of example, if conduit 11 and first fitted ring 16 are both made of metal, then the outer cylindrical surface of conduit 11 can be welded to approximately half of cylindrical inside surface 37 of first fitted ring 16. By way of another example, if conduit 11 and first fitted ring 16 are both made of plastic, then the outer cylindrical surface of conduit 11 can be glued to approximately half of cylindrical inside surface 37 of first fitted ring 16.

When the outer cylindrical surface of conduit 11 is permanently affixed to approximately half of cylindrical inside surface 37 of first fitted ring 16, an annular region 39 is created within first fitted ring 16 located axially outwardly adjacent to the end opening of conduit 11. In addition, a radial shoulder 40 is formed at the axially inwardmost end of annular region 39 to provide an abutment stop to engage seal ring 21, as discussed in more detail below.

Referring to FIGS. 3 and 6, first fitted ring 16 preferably has a first longitudinal notch 41 in cylindrical outside surface 36. First longitudinal notch 41 preferably extends the entire length 38 of first fitted ring 16. First fitted ring 16 also preferably has a second longitudinal notch 42 located on the opposite side of first fitted ring 16 from first longitudinal notch 41. Like first longitudinal notch 41, second longitudinal notch 42 is in cylindrical outside surface 36 and extends the entire length 38 of first fitted ring 16. First longitudinal notch 41 and second longitudinal notch 42 are illustrated with rectangular shapes, but any other suitable geometric shapes would not depart from the spirit and scope of the claimed invention. The purpose of first and second longitudinal notches 41 and 42 is discussed below.

Referring to FIGS. 3 and 5, second fitted ring 18 is a substantially annular member with an annular opening. Second fitted ring 18 can be made of several kinds of materials, such as carbon steel, stainless steel, super duplex stainless steel, high alloy steel, cast iron, aluminum, polyvinyl chloride ("PVC"), fiberglass, plastic, composite, etc., depending on the application. The dimensions of second fitted ring 18 will depend on the size of the conduits being connected. Larger dimensions of second fitted ring 18 are required when larger conduits are being connected, and vice versa. The dimensions of second fitted ring 18 will also depend on the operating pressure inside the conduits being connected. The thickness of second fitted ring 18 will typically increase as operating pressures inside the conduits are increased, and vice versa.

Still referring to FIGS. 3 and 5, second fitted ring 18 preferably has a first end 43, a second end 44, an outer diameter 45, an inner diameter 46, a cylindrical outside surface 47, a cylindrical inside surface 48, and a length 49. Inner diameter 46 of first fitted ring 16 should be the same as or slightly greater than the outer diameter of conduit 12 so that the end of conduit 12 can be longitudinally inserted through second end 44 of second fitted ring 18 approximately half the length 49 of second fitted ring 16. When the end of conduit 12 is longitudinally inserted through second end 44 of second fitted ring 18, a portion of the outer cylindrical surface of conduit 12 preferably should be in contact with approximately half of cylindrical inside surface 48 of second fitted ring 16.

In the preferred embodiment, the outer cylindrical surface of conduit 12 can be permanently affixed to approximately half of cylindrical inside surface 48 of second fitted ring 18. By way of example, if conduit 12 and second fitted ring 18 are both made of metal, then the outer cylindrical surface of conduit 12 can be welded to approximately half of cylindrical inside surface 48 of second fitted ring 18. By way of another example, if conduit 12 and second fitted ring 18 are both made of plastic, then the outer cylindrical surface of conduit 12 can be glued to approximately half of cylindrical inside surface 48 of second fitted ring 18.

When the outer cylindrical surface of conduit 12 is permanently affixed to approximately half of cylindrical inside surface 48 of second fitted ring 18, an annular region 50 is created within second fitted ring 16 located axially outwardly adjacent to the end opening of conduit 12. In addition, a radial shoulder 51 is formed at the axially inwardmost end of annular region 50 to provide an abutment stop to engage seal ring 21, as discussed in more detail below.

Referring to FIG. 3, second fitted ring 18 preferably has a first longitudinal notch 52 in cylindrical outside surface 47. First longitudinal notch 52 preferably extends the entire length 49 of second fitted ring 18. Second fitted ring 18 also preferably has a second longitudinal notch 53 located on the opposite side of second fitted ring 18 from first longitudinal notch 52. Like first longitudinal notch 52, second longitudinal notch 53 is in cylindrical outside surface 47 and extends the entire length 49 of second fitted ring 18. First longitudinal notch 52 and second longitudinal notch 53 are illustrated with rectangular shapes, but any other suitable geometric shapes would not depart from the spirit and scope of the claimed invention. The purpose of first and second longitudinal notches 52 and 53 is discussed below.

Referring to FIGS. 3, 5, and 6, seal ring 21 is a substantially annular member with an annular opening. Seal ring 21 can be made of several kinds of materials, such as carbon steel, stainless steel, super duplex stainless steel, high alloy steel, cast iron, aluminum, polyvinyl chloride ("PVC"), fiberglass, plastic, composite, etc., depending on the application. The dimensions of seal ring 21 will depend on the size of the conduits being connected. Larger dimensions of seal ring 21 are required when larger conduits are being connected, and vice versa. The dimensions of seal ring 21 will also depend on the operating pressure inside the conduits being connected. The thickness of seal ring 21 will typically increase as operating pressures inside the conduits are increased, and vice versa.

Still referring to FIGS. 3, 5, and 6, seal ring 21 preferably has a first end 54, a second end 55, an outer diameter 56, an inner diameter 57, a cylindrical outside surface 58, a cylindrical inside surface 59, and a length 60. Outer diameter 56 of seal ring 21 is preferably the same as or slightly less than the inner diameter 35 of first fitted ring 16 attached to conduit 11 so that the first end 54 of seal ring 21 can be longitudinally inserted into annular region 39 inside first fitted ring 16. Likewise, outer diameter 56 of seal ring 21 is preferably the same as or slightly less than the inner diameter 46 of second fitted ring 18 attached to conduit 12 so that the second end 55 of seal ring 21 can be longitudinally inserted into annular region 50 inside second fitted ring 18. Inner diameter 57 of seal ring 21 is preferably substantially equal to the inner diameters of conduits 11 and 12.

As shown in FIGS. 3 and 5, seal ring 21 preferably has a circumferential ridge 61 projecting radially outwardly from outside surface 58 of seal ring 21 approximately intermediate first end 54 of seal ring 21 and second end 55 of seal ring 21. Ridge 61 preferably forms an annular disk around seal ring 21 in the nature of a washer having an outer diameter 62 substantially equal to the outer diameter 34 of first fitted ring 16 and the outer diameter 45 of second fitted ring 18. Ridge 61 is preferably rectangular in shape with a length 63 and with an arcuate curvature in the direction of the circumference of seal ring 21, but any other suitable geometric shape would not depart from the spirit and scope of the claimed invention.

Referring to FIG. 3, ridge 61 preferably has a first longitudinal notch 64 extending the entire length 63 of ridge 61. Ridge 61 also preferably has a second longitudinal notch 65 located on the opposite side of ridge 61 from first longitudinal notch 64. Like first longitudinal notch 64, second longitudinal notch 65 extends the entire length 63 of ridge 61. First longitudinal notch 64 is designed to line up with first notch 41 on first fitted ring 16 and with first notch 52 on second fitted ring 18. Second longitudinal notch 65 is designed to line up with second notch 42 on first fitted ring 16 and with second notch 53 on second fitted ring 18. First longitudinal notch 64 and second longitudinal notch 65 are illustrated with rectangular shapes, but any other suitable geometric shapes would not depart from the spirit and scope of the claimed invention. The purpose of first and second longitudinal notches 64 and 65 in conjunction with the first and second notches 41 and 42 of first fitted ring 16 and the first and second notches 52 and 53 of second fitted ring 18 is discussed below.

As shown in FIG. 5, seal ring 21 preferably has a first circumferential groove 66 in outside surface 58 of seal ring 21 between first end 54 of seal ring 21 and ridge 61 of seal ring 21. Seal ring 21 also preferably has a second circumferential groove 67 in outside surface 58 of seal ring 21 between second end 55 of seal ring 21 and ridge 61 of seal ring 21. First circumferential groove 66 and second circumferential groove 67 are illustrated with rectangular shapes, but any other suitable geometric shapes would not depart from the spirit and scope of the claimed invention.

As shown in FIGS. 3 and 5, first circumferential groove 66 on seal ring 21 is designed to receive first annular sealing member 19. Second circumferential groove 67 on seal ring 21 is designed to received second annular sealing member 20. First and second annular sealing members 19 and 20 are preferably made from Buna, Vito, EPDM, Teflon, Nitril, Kalrez, or Chemraz to form a pliable fluid-tight seal between the outside surface 58 of seal ring 21 and the outside surfaces 36 and 47 of first and second fitted rings 16 and 18, respectively. Although several elastomeric materials have been discussed, various polymers, thermoplastics, or rubbers could also be used as suitable materials for annular sealing members 19 and 20 without departing from the spirit and scope of the claimed invention.

Referring to FIGS. 3 through 6, clamp ring 22 includes a first semi-circular half 68 and a second semi-circular half 69. First semi-circular half 68 and second semi-circular half 69 can be made of several kinds of materials, such as carbon steel, stainless steel, super duplex stainless steel, high alloy steel, cast iron, aluminum, polyvinyl chloride ("PVC"), fiberglass, plastic, composite, etc., depending on the application. The dimensions of first semi-circular half 68 and second semi-circular half 69 will depend on the size of the conduits being connected. Larger dimensions of first semi-circular half 68 and second semi-circular half 69 are required when larger conduits are being connected, and vice versa.

Still referring to FIGS. 3 through 6, first semi-circular half 68 of clamp ring 22 preferably has a first end 70, a second end 71, a cylindrical outside surface 72, a cylindrical inside surface 73, and a length 74. First semi-circular half 68 of clamp ring 22 also preferably has a first circumferential lip 75 projecting radially inwardly from first end 70, and a second circumferential lip 76 projecting radially inwardly from second end 71. First and second lips 75 and 76 are preferably and generally rectangular in shape with an arcuate curvature in the direction of the circumference of first semi-circular half 68 of clamp ring 22, but any other suitable geometric shape would not depart from the spirit and scope of the claimed invention. As shown in FIGS. 3 and 5, the inside surface of first lip 75 of first semi-circular half 68 creates a radially inner annular shoulder 77. Likewise, the inside surface of second lip 76 of first semi-circular half 69 creates a radially inner annular shoulder 78.

As shown in FIGS. 5 and 6, first semi-circular half 68 of clamp ring 22 also preferably has a longitudinal ridge 88 extending radially inwardly from inside surface 73 at substantially the midpoint of the arc of first semi-circular half 68. Longitudinal ridge 88 is preferably and generally rectangular in shape, although other geometric shapes would not depart from the spirit and scope of the claimed invention. Longitudinal ridge 88 preferably extends longitudinally from shoulder 77 to shoulder 78 of first semi-circular half 68. Longitudinal ridge 88 is designed to line up with first notch 41 on first fitted ring 16, first notch 52 on second fitted ring 18, and first notch 64 on ridge 61 of seal ring 21. The purpose of longitudinal ridge 88 in conjunction with first notch 41 on first fitted ring 16, first notch 52 on second fitted ring 18, and first notch 64 on ridge 61 of seal ring 21, is discussed below.

Still referring to FIGS. 3 through 6, second semi-circular half 69 of clamp ring 22 preferably has a first end 79, a second end 80, a cylindrical outside surface 81, a cylindrical inside surface 82, and a length 83. Second semi-circular half 69 of clamp ring 22 also preferably has a first circumferential lip 84 projecting radially inwardly from first end 79, and a second circumferential lip 85 projecting radially inwardly from second end 80. First and second lips 84 and 85 are preferably and generally rectangular in shape with an arcuate curvature in the direction of the circumference of second semi-circular half 69 of clamp ring 22, but any other suitable geometric shapes would not depart from the spirit and scope of the claimed invention. As shown in FIGS. 3 and 5, the inside surface of first lip 84 of second semi-circular half 69 creates a radially inner annular shoulder 86. Likewise, the inside surface of second lip 85 of second semi-circular half 69 creates a radially inner annular shoulder 87.

As shown in FIGS. 3, 5, and 6, second semi-circular half 69 of clamp ring 22 also preferably has a longitudinal ridge 89 extending radially inwardly from inside surface 82 at substantially the midpoint of the arc of second semi-circular half 69. Longitudinal ridge 89 is preferably and generally rectangular in shape, although other geometric shapes would not depart from the spirit and scope of the claimed invention. Longitudinal ridge 89 preferably extends longitudinally from shoulder 86 to shoulder 87 of second semi-circular half 69. Longitudinal ridge 89 is designed to line up with second notch 42 on first fitted ring 16, second notch 53 on second fitted ring 18, and second notch 65 on ridge 61 of seal ring 21. The purpose of longitudinal ridge 89 in conjunction with second notch 42 on first fitted ring 16, second notch 53 on second fitted ring 18, and second notch 65 on ridge 61 of seal ring 21 is discussed below.

When first semi-circular half 68 and second semi-circular half 69 are fit together to form clamp ring 22, as shown in FIGS. 4, 5, and 6, clamp ring 22 preferably has an inner diameter 90 that is equal to or slightly greater than the outer diameter 34 of first fitted ring 16, the outer diameter 45 of second fitted ring 18, and the outer diameter 62 of ridge 61 on seal ring 21.

Referring to FIGS. 1 through 6, lock housing 23 is a substantially cylindrical body with an annular opening. Lock housing 23 can be made of several kinds of materials, such as carbon steel, stainless steel, super duplex stainless steel, high alloy steel, cast iron, aluminum, polyvinyl chloride ("PVC"), fiberglass, plastic, composite, etc., depending on the application. The dimensions of lock housing 23 will depend on the size of the conduits being connected. Larger dimensions of lock housing 23 are required when larger conduits are being connected, and vice versa.

Still referring to FIGS. 1 through 6, lock housing 23 preferably has a first end 91, a second end 92, an outer diameter 93, an inner diameter 94, a cylindrical outside surface 95, a cylindrical inside surface 96, and a length 97. Inner diameter 94 of lock housing 23 is preferably slightly greater than the outer diameter 98 of clamp ring 22 so that lock housing 23 can be longitudinally placed over clamp ring 22, as shown in FIGS. 1 and 2.

Lock housing 23 preferably has a circumferential lip 99 projecting radially inwardly from first end 91. Lip 99 is preferably and generally rectangular in shape with an arcuate curvature in the direction of the circumference of lock housing 23, but any suitable geometric shape would not depart from the spirit and scope of the claimed invention. As shown in FIG. 5, the inside surface of lip 99 of lock housing 23 creates a radially inner annular shoulder 100.

As shown in FIGS. 5 through 6, lock housing 23 preferably has two handles 101 and 102 to facilitate placement of lock housing 23 over clamp ring 22 and removal of lock housing 23 from clamp ring 22. In the preferred embodiment, handles 101 and 102 are made of round bar. In the preferred embodiment, each handle 101 and 102 has a bar 103 and 104, respectively, that is attached to the outside surface of lip 99, as shown in FIG. 5. From the attachment point on the outside surface of lip 99, each bar 103 and 104 curves around the first end 91 of lock housing 23 and then runs substantially longitudinally and parallel to the outside surface 95 of lock housing 23. The distance between the longitudinal run of each bar 103 and 104 and outside surface 95 of lock housing 23 should be enough to allow a person to grip the bar with his or her hand, even if the person is wearing gloves. Each bar 103 and 104 ends its longitudinal run near the second end 92 of lock housing 23, and then turns substantially radially toward outside surface 95 of lock housing 23 until it reaches another attachment point near second end 92 of lock housing 23, as shown in FIGS. 1 through 5. In the preferred embodiment, each handle 101 and 102 has a support bar 105 and 106, respectively, which extends radially outwardly from outside surface 95 of lock housing 23 to the longitudinal run of bar 103 and 104, respectively, as shown in FIGS. 1 through 5.

As shown in FIGS. 1 through 4, lock housing 23 can be equipped with a set of tangential port holes 107 near second end 92 of lock housing 23. Port holes 107 are designed to receive a locking pin (not shown), which serves to prevent lock housing 23 from being inadvertently removed from its position over clamp ring 22, as discussed in more detail below.

To connect two conduits using the preferred embodiment of the quick coupling system 10 illustrated in FIGS. 1 through 6, and particularly in the case of a vertical installation of conduits, a stop ring 14 is fitted around second conduit 12 and attached, preferably but not necessarily by welding, near the top of second conduit 12 so that installation tool 31 can be used to hold second conduit 12 vertically in place while quick coupling system 10 is used to couple second conduit 12 to first conduit 11. When quick coupling system 10 is not being used in a vertical installation of conduits, then stop ring 14 does not need to be attached to any conduits.

Next, lock housing 23 is positioned on first conduit 11, as shown in FIG. 3, so that it can be longitudinally placed over clamp ring 22 later during the installation process, as discussed below.

Next, end 17 of conduit 11 is longitudinally inserted through first end 32 of first fitted ring 16 approximately half the length 38 of first fitted ring 16 so that a portion of the outer cylindrical surface of conduit 11 is in contact with approximately half of cylindrical inside surface 37 of first fitted ring 16, thereby creating annular region 39 inside first fitted ring 16. The outer cylindrical surface of conduit 11 can be permanently affixed to approximately half of cylindrical inside surface 37 of first fitted ring 16 either by welding, as an example, if conduit 11 and first fitted ring 16 are both made of metal, or by gluing, as another example, if conduit 11 and first fitted ring 16 are both made of plastic.

Next, end 15 of conduit 12 is longitudinally inserted through second end 44 of second fitted ring 18 approximately half the length 49 of second fitted ring 18 so that a portion of the outer cylindrical surface of conduit 12 is in contact with approximately half of cylindrical inside surface 48 of second fitted ring 18, thereby creating annular region 50 inside second fitted ring 18. The outer cylindrical surface of conduit 12 can be permanently affixed to approximately half of cylindrical inside surface 48 of second fitted ring 18 either by welding, as an example, if conduit 12 and second fitted ring 18 are both made of metal, or by gluing, as another example, if conduit 12 and second fitted ring 18 are both made of plastic.

Next, first annular sealing member 19 is placed into first circumferential groove 66 on seal ring 21. In addition, second annular sealing member 20 is placed into second circumferential groove 67 on seal ring 21.

Next, first end 54 of seal ring 21 is longitudinally inserted into annular region 39 inside first fitted ring 16 installed on first conduit 11 until first end 54 of seal ring 21 abuts against or is in close proximity to radial shoulder 40 of first fitted ring 16, and ridge 61 of seal ring 21 abuts against or is in close proximity to second end 33 of first fitted ring 16. Although it is desired to have first end 54 of seal ring 21 abutting against radial shoulder 40 of first fitted ring 16, and to have ridge 61 of seal ring 21 abutting against second end 33 of first fitted ring 16, this may not always be the case and a gap may exist between these parts.

When first end 54 of seal ring 21 is longitudinally inserted into annular region 39 inside first fitted ring 16 installed on first conduit 11, as described above, first notch 64 on ridge 61 of seal ring 21 should be longitudinally aligned with first notch 41 on first fitted ring 16, and second notch 65 on ridge 61 of seal ring 21 should be longitudinally aligned with second notch 42 on first fitted ring 16. In this configuration, a pliable, fluid-tight circumferential seal is created between seal ring 21 and first end ring 16 when first annular sealing member 19 is compressed into contact with the surface of the first circumferential groove 66 of seal ring 21 and the cylindrical inside surface 37 of first fitted ring 16. In addition, in this configuration, a substantially smooth transition exists from inside surface 59 of seal ring 21 to inside surface of first conduit 11, as shown in FIG. 5.

Next, second end 55 of seal ring 21 is longitudinally inserted into annular region 50 inside second fitted ring 18 installed on second conduit 12 until second end 55 of seal ring 21 abuts against or is in close proximity to radial shoulder 51 of second fitted ring 18, and ridge 61 of seal ring 21 abuts against or is in close proximity to first end 43 of second fitted ring 18. Although it is desired to have second end 55 of seal ring 21 abutting against radial shoulder 51 of second fitted ring 18, and to have ridge 61 of seal ring 21 abutting against first end 43 of second fitted ring 18, this may not always be the case and a gap may exist between these parts.

When second end 55 of seal ring 21 is longitudinally inserted into annular region 50 inside second fitted ring 18 installed on second conduit 12, as described above, first notch 64 on ridge 61 of seal ring 21 should be longitudinally aligned with first notch 52 on second fitted ring 18, and second notch 65 on ridge 61 of seal ring 21 should be longitudinally aligned with second notch 53 on second fitted ring 18. In this configuration, a pliable, fluid-tight circumferential seal is created between seal ring 21 and second end ring 18 when second annular sealing member 20 is compressed into contact with the surface of the second circumferential groove 67 of seal ring 21 and the cylindrical inside surface 48 of second fitted ring 18. In addition, in this configuration, a substantially smooth transition exists from inside surface 59 of seal ring 21 to inside surface of second conduit 12, as shown in FIG. 5.

When first end 54 of seal ring 21 is longitudinally inserted into annular region 39 inside first fitted ring 16 installed on first conduit 11, as described above, and when second end 55 of seal ring 21 is longitudinally inserted into annular region 50 inside second fitted ring 18 installed on second conduit 12, as described above, a joint is formed between first conduit 11 and second conduit 12, as shown in FIG. 5. The joint is held together by positioning clamp ring 22 over and around first fitted ring 16, second fitted ring 18, and seal ring 21. First semi-circular half 68 of clamp ring 22 is positioned over half of first fitted ring 16, half of second fitted ring 18, and half of seal ring 21, so that ridge 88 on first semi-circular half 68 of clamp ring 22 fits into first notch 41 on first fitted ring 16, first notch 52 on second fitted ring 18, and first notch 64 on ridge 61 of seal ring 21, and so that half of first end 32 of first fitted ring 16 abuts against or is in close proximity to shoulder 77 on the inside surface of the first lip 75 of first semi-circular half 68 of clamp ring 22, and so that half of second end 44 of second fitted ring 18 abuts against or is in close proximity to shoulder 78 on the inside surface of the second lip 76 of first semi-circular half 68 of clamp ring 22. Although it is desired to have half of first end 32 of first fitted ring 16 abutting against shoulder 77 on the inside surface of the first lip 75 of first semi-circular half 68 of clamp ring 22, and half of second end 44 of second fitted ring 18 abutting against shoulder 78 on the inside surface of the second lip 76 of first semi-circular half 68 of clamp ring 22, this may not always be the case and a gap may exist between these parts.

In addition, second semi-circular half 69 of clamp ring 22 is positioned over the remaining half of first fitted ring 16, the remaining half of second fitted ring 18, and the remaining half of seal ring 21, so that ridge 89 on second semi-circular half 69 of clamp ring 22 fits into second notch 42 on first fitted ring 16, second notch 53 on second fitted ring 18, and second notch 65 on ridge 61 of seal ring 21, and so that the remaining half of first end 32 of first fitted ring 16 abuts against or is in close proximity to shoulder 86 on the inside surface of the first lip 84 of second semi-circular half 69 of clamp ring 22, and so that the remaining half of second end 44 of second fitted ring 18 abuts against or is in close proximity to shoulder 87 on the inside surface of the second lip 85 of second semi-circular half 69 of clamp ring 22. Although it is desired to have half of first end 32 of first fitted ring 16 abutting against shoulder 86 on the inside surface of the first lip 84 of second semi-circular half 69 of clamp ring 22, and half of second end 44 of second fitted ring 18 abutting against shoulder 87 on the inside surface of the second lip 85 of second semi-circular half 69 of clamp ring 22, this may not always be the case and a gap may exist between these parts.

First semi-circular half 68 and second semi-circular half 69 of clamp ring 22 are held together over and around first fitted ring 16, second fitted ring 18, and seal ring 21, by longitudinally sliding lock housing 23 over clamp ring 22, as shown in FIGS. 1, 2, 5, and 6. Lock housing 23 can be held in this position over clamp ring 22 by inserting a locking pin (not shown) into tangential port holes 107 near second end 92 of lock housing 23. When the locking pin is inserted into tangential port holes 107, and when a longitudinal force is applied to remove lock housing 23 from over clamp ring 22, the locking pin buts up against the second end 71 of first half 68 of clamp ring 22 or the second end 80 of second half 69 of clamp ring 22, and prevents further longitudinal movement of lock housing 23.

As described and illustrated above, the assembly of the quick coupling system 10 retains the connection between first conduit 11 and second conduit 12. Upon the exertion of any axially outwardly forces, quick coupling system 10 prevents the connection between first conduit 11 and second conduit 12 from separating. Once quick coupling system 10 is installed at one joint between two conduits, the installation process can be repeated at another joint between two conduits. In addition, the steps described and illustrated above can be reversed to remove the quick coupling system 10 from first conduit 11 and second conduit 12, thereby allowing separation of conduit 11 and conduit 12.

As described and illustrated, the quick coupling system 10 provides a low cost, easy to install device for securing and sealing a joint between two conduits. The quick coupling system 10 can be used on a variety of pipe types and sizes.

It is understood that one embodiment of the present invention has been disclosed by way of example and that other modifications and alterations may occur to those skilled in the art without departing from the scope and spirit of the present invention.

What is claimed is:

1. A coupling system for connecting conduits, said coupling system comprising:
   (a) a first conduit having an end and an outside surface;
   (b) a second conduit having an end and an outside surface;
   (c) a first fitted ring affixed to said end of said first conduit, wherein said first fitted ring is annular in shape and has an annular opening with an inside surface and an inner diameter so that said first fitted ring can be affixed to said end of said first conduit wherein a portion of said inside surface of said first fitted ring overlaps with said outside surface of said first conduit and the remaining portion of said inside surface of said first fitted ring extends past said end of said first conduit, further comprising:
      i) an outside surface on said first fitted ring;
      ii) a first end and a second end on said first fitted ring;
      iii) a first notch in said outside surface on said first fitted ring, said first notch extending from said first end to said second end on said first fitted ring;
      iv) a second notch in said outside surface on said first fitted ring 180 degrees apart from said first notch on said first fitted ring, said second notch extending from said first end to said second end on said first fitted ring;
   (d) a second fitted ring affixed to said end of said second conduit, wherein said second fitted ring is annular in shape and has an annular opening with an inside surface and an inner diameter so that said second fitted ring can be affixed to said end of said second conduit wherein a portion of said inside surface of said second fitted ring overlaps with said outside surface of said second conduit and the remaining portion of said inside surface of said second fitted ring extends past said end of said second conduit, further comprising:
      i) an outside surface on said second fitted ring;
      ii) a first end and a second end on said second fitting ring;
      iii) a first notch in said outside surface on said second fitted ring, said first notch extending from said first end to said second end on said second fitted ring;
      iv) a second notch in said outside surface on said second fitted ring 180 degrees apart from said first notch on said second fitted ring, said second notch extending from said first end to said second end on said second fitted ring;
   (e) a seal ring having a first end, a second end, an outside surface, and a ridge projecting radially outwardly from said outside surface of said seal ring, said seal ring having a circumferential groove in the outside surface of said seal ring on each side of said ridge, said seal ring having a sealing member inserted into each of said circumferential grooves of said seal ring, where said first end of said seal ring is inserted into said first fitted ring affixed to said end of said first conduit to provide a seal between said first fitted ring and said seal ring, and where said second end of said seal ring is inserted into said second fitted ring affixed to said end of said second conduit to provide a seal between said second fitted ring and said seal ring, further comprising a first notch in said ridge of said seal ring, and a second notch in said ridge of said seal ring 180 degrees apart from said first notch in said ridge of said seal ring, wherein:
  i) said first end of said seal ring is inserted into said first fitted ring affixed to said end of said first conduit so that said outside surface of said seal ring between said first end of said seal ring and said circumferential groove of said seal ring overlaps with said remaining portion of said inside surface of said first fitted ring that extends past said end of said first conduit to provide a seal between said first fitted ring and said seal ring;
  ii) said second end of said seal ring is inserted into said second fitted ring affixed to said end of said second conduit so that said outside surface of said seal ring between said second end of said seal ring and said circumferential groove of said seal ring overlaps with said remaining portion of said inside surface of said second fitted ring that extends past said end of said second conduit to provide a seal between said second fitted ring and said seal ring;
(f) a two-piece clamp ring clamped around said first fitted ring, said seal ring, and said second fitted ring, to keep said first fitted ring, said seal ring, and said second fitted ring aligned and coupled together, wherein said two-piece clamp ring further comprises:
  i) a first semi-circular half having a first end, a second end, a cylindrical outside surface, a cylindrical inside surface, a length, a first circumferential lip projecting radially inwardly from said first end of said first semi-circular half, a second circumferential lip projecting radially inwardly from said second end of said first semi-circular half, and a longitudinal ridge extending radially inwardly from said cylindrical inside surface of said first semi-circular half between said first circumferential lip and said second circumferential lip of said first semi-circular half;
  ii) a second semi-circular half having a first end, a second end, a cylindrical outside surface, a cylindrical inside surface, a length, a first circumferential lip projecting radially inwardly from said first end of said second semi-circular half, a second circumferential lip projecting radially inwardly from said second end of said second semi-circular half, and a longitudinal ridge extending radially inwardly from said cylindrical inside surface of said second semi-circular half between said first circumferential lip and said second circumferential lip of said second semi-circular half;
(g) a lock housing positioned over said two-piece clamp ring to keep said two-piece clamp ring clamped together, wherein said lock housing further comprises a cylindrical body with an annular opening, a first end, a circumferential lip projecting radially inwardly from said first end of said lock housing, and at least one handle to facilitate placement of said lock housing over said two-piece clamp ring; and
(h) a stop ring affixed to said second conduit for vertically hanging said second conduit during the coupling process.

2. The coupling system of claim 1, where said first notch in said outside surface on said first fitted ring, said first notch in said outside surface on said second fitted ring, and said first notch in said ridge of said seal ring, are aligned when said first fitted ring, said second fitted ring, and said seal ring are coupled together.

3. The coupling system of claim 2, where said second notch in said outside surface on said first fitted ring, said second notch in said outside surface on said second fitted ring, and said second notch in said ridge of said seal ring, are aligned when said first fitted ring, said second fitted ring, and said seal ring are coupled together.

4. A coupling system for connecting conduits, said coupling system comprising:
  (a) a first fitted ring having an annular opening, a first end, a second end, a length, an inside surface, an outside surface, a first notch in said outside surface extending said length of said first fitted ring, and a second notch in said outside surface extending said length of said first fitting ring;
  (b) a first conduit having an end, where said end of said first conduit is affixed to said first end of said first fitted ring;
  (c) a second fitted ring having an annular opening, a first end, and a second end, a length, an inside surface, an outside surface, a first notch in said outside surface extending said length of said second fitted ring, and a second notch in said outside surface extending said length of said second fitting ring;
  (d) a second conduit having an end, where said end of said second conduit is affixed to said second end of said second fitting ring;
  (e) a seal ring having an annular opening, a first end, a second end, an outside surface, and a ridge projecting radially outwardly from said outside surface of said seal ring between said first end and said second end of said seal ring, said ridge having a first notch and a second notch, said seal ring having a first circumferential groove on said outside surface of said seal ring between said first end and said ridge of said seal ring, a first sealing member inserted into said first circumferential groove of said seal ring, a second circumferential groove on said outside surface of said seal ring between said second end and said ridge of said seal ring, and a second sealing member inserted into said second circumferential groove of said seal ring, where said first end of said seal ring is inserted through said second end of said first fitted ring so that said first sealing member provides a seal between said inside surface of said first fitted ring and said outside surface of said seal ring, and so that said first notch of said first fitted ring is aligned with said first notch of said ridge of said seal ring, and said second notch of said first fitted ring is aligned with said second notch of said ridge of said seal ring, and where said second end of said seal ring is inserted through said first end of said second fitted ring so that said second sealing member provides a seal between said inside surface of said second fitted ring and said outside surface of said seal ring, and so that said first notch of said second fitted ring is aligned with said first notch of said ridge of said seal ring, and said second notch of said second fitted ring is aligned with said second notch of said ridge of said seal ring;

(f) a two-piece clamp ring having a first half and a second half, said first half of said two-piece clamp ring having a first end with a lip projecting radially inwardly and a second end with a lip projecting radially inwardly, said first half of said two-piece clamp ring having an inside surface with a ridge extending between said lip on said first end and said lip on said second end of said first half, said second half of said two-piece clamp ring having a first end with a lip projecting radially inwardly and a second end with a lip projecting radially inwardly, said second half of said two-piece clamp ring having an inside surface with a ridge extending between said lip on said first end and said lip on said second end of said second half, where said first half and said second half of said two-piece clamp ring are fitted together to form a two-piece clamp ring around said first fitted ring, said second fitted ring, and said seal ring, where said ridge extending between said lip on said first end and said lip on said second end of said first half fits into said first notch of said first fitted ring, said first notch of said seal ring, and said first notch of said second fitted ring, and where said ridge extending between said lip on said first end and said lip on said second end of said second half fits into said second notch of said first fitted ring, said second notch of said seal ring, and said second notch of said second fitted ring, and where said lip of said first end of said first half of said two-piece clamp ring and said lip of said first end of said second half of said two-piece clamp ring are positioned adjacent to said first end of said first fitted ring, and where said lip of said second end of said first half of said two-piece clamp ring and said lip of said second end of said second half of said two-piece clamp ring are positioned adjacent to said second end of said second fitted ring, to keep said first fitted ring, said seal ring, and said second fitted ring coupled together;

(g) a lock housing positioned over said two-piece clamp ring to prevent first half and a second half of two-piece clamp ring clamped together.

5. The coupling system of claim 4, further comprising:
(a) a stop ring affixed to said second conduit for vertically hanging said second conduit during the coupling process.

6. The coupling system of claim 5, said lock housing further comprising:
(a) a cylindrical body with an annular opening;
(b) a first end;
(c) a circumferential lip projecting radially inwardly from said first end of said lock housing;
(d) at least one handle to facilitate placement of said lock housing over said two-piece clamp ring.

* * * * *